US012181102B2

(12) United States Patent
Schaich

(10) Patent No.: US 12,181,102 B2
(45) Date of Patent: Dec. 31, 2024

(54) TANK DEVICE WITH A VALVE DEVICE

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/245,318

(22) PCT Filed: Aug. 16, 2021

(86) PCT No.: PCT/EP2021/072763
§ 371 (c)(1),
(2) Date: Mar. 14, 2023

(87) PCT Pub. No.: WO2022/063489
PCT Pub. Date: Mar. 31, 2022

(65) Prior Publication Data
US 2024/0019083 A1 Jan. 18, 2024

(30) Foreign Application Priority Data

Sep. 23, 2020 (DE) ...................... 10 2020 211 860.4

(51) Int. Cl.
*F17C 13/04* (2006.01)
*F16K 1/30* (2006.01)
(Continued)

(52) U.S. Cl.
CPC .............. *F17C 13/04* (2013.01); *F16K 1/306* (2013.01); *F16K 31/42* (2013.01); *H01M 8/04089* (2013.01); *F17C 2221/012* (2013.01)

(58) Field of Classification Search
CPC ...... F16K 31/0655; F16K 1/306; F16K 31/42; F17C 13/04; F17C 2221/012;
(Continued)

(56) References Cited

U.S. PATENT DOCUMENTS 4,540,154 A * 9/1985 Kolchinsky ........... F16K 31/408
335/278
5,169,117 A 12/1992 Huang
(Continued)

FOREIGN PATENT DOCUMENTS

DE 102012210943 A1 1/2014
DE 102018201055 A1 7/2019
(Continued)

OTHER PUBLICATIONS

Translation of JP2009210120A retrieved from espacenet.com on Apr. 27, 2024 (Year: 2024).*
(Continued)

*Primary Examiner* — Jessica Cahill
(74) *Attorney, Agent, or Firm* — Michael Best & Friedrich LLP

(57) ABSTRACT

A tank device for storing a gaseous medium includes a valve device and a tank, the valve device includes a valve housing with a pilot valve element movable by a solenoid coil. The pilot valve element interacts with a first seal seat. A main valve element is arranged in the valve housing and, in order to open and close a through-opening, interacts with a second seal seat formed as a conical shoulder on the valve housing. A throttle channel is formed between the valve housing and an integrally molded shaping of the main valve element, which integrally molded shaping interacts with a second seal seat to open and close the through-opening, and said throttle channel has a conical widening against a direction of the second seal seat, whereby a throttle effect is provided, the valve device being openable in a direction of the tank when the solenoid coil is energized.

17 Claims, 1 Drawing Sheet

(51) Int. Cl.
*F16K 31/42* (2006.01)
*H01M 8/04089* (2016.01)

(58) Field of Classification Search
CPC .......... H01M 8/04089; Y10T 137/2635; Y10T 137/7761; Y10T 137/7765; Y10T 137/7766
See application file for complete search history.

(56) References Cited

U.S. PATENT DOCUMENTS

| | | | | |
|---|---|---|---|---|
| 5,197,710 | A * | 3/1993 | Wass | F17C 13/123 |
| | | | | 222/3 |
| 6,830,230 | B2 | 12/2004 | Simoens | |
| 6,962,317 | B2 | 11/2005 | Simoens | |
| 7,080,817 | B2 | 7/2006 | Stern | |
| 8,151,819 | B2 * | 4/2012 | Suzuki | F17C 13/04 |
| | | | | 137/320 |
| 10,161,360 | B2 * | 12/2018 | Ninomiya | F02M 21/0233 |
| 11,619,319 | B2 * | 4/2023 | Beier | F16K 31/408 |
| | | | | 137/487.5 |
| 11,808,552 | B1 | 11/2023 | Italia | |
| 2007/0090317 | A1 * | 4/2007 | Kamiya | F17C 13/04 |
| | | | | 251/129.15 |
| 2009/0236551 | A1 * | 9/2009 | Nomichi | F17C 13/04 |
| | | | | 137/79 |
| 2011/0068286 | A1 * | 3/2011 | Nomichi | F16K 31/0655 |
| | | | | 251/129.15 |
| 2012/0199775 | A1 * | 8/2012 | Watanabe | F16K 31/0655 |
| | | | | 251/129.15 |
| 2016/0208954 | A1 * | 7/2016 | Ito | F16K 31/0665 |
| 2016/0305572 | A1 | 10/2016 | Becker et al. | |

FOREIGN PATENT DOCUMENTS

| | | | |
|---|---|---|---|
| EP | 0195206 | A1 * | 9/1986 |
| EP | 0668468 | B1 | 9/1999 |
| FR | 2544834 | A1 | 10/1984 |
| JP | 2002039429 | A | 2/2002 |
| JP | 2009210120 | A | 9/2009 |
| JP | 2010121728 | A | 6/2010 |
| JP | 2012189107 | A | 10/2012 |
| JP | 2014214804 | A | 11/2014 |
| JP | 2023526126 | A | 6/2023 |
| JP | 2023539904 | A | 9/2023 |
| JP | 2023539911 | A | 9/2023 |
| KR | 100766872 | B1 | 10/2007 |
| KR | 20140079627 | A | 6/2014 |
| WO | WO-2013031191 | A1 * | 3/2013 ............ F16K 1/305 |
| WO | 2015129159 | A1 | 9/2015 |

OTHER PUBLICATIONS

Fuel Cells, Department of Energy, retrieved from https://www.energy.gov/eere/fuelcells/fuel-cells#:~:text=A%20fuel%20cell%20consists%20of,is%20fed%20to%20the%20cathode. (retrieved Apr. 29, 2024). (Year: 2024).*

Translation of International Search Report for Application No. PCT/EP2021/072763 dated Dec. 10, 2021 (2 pages).

* cited by examiner

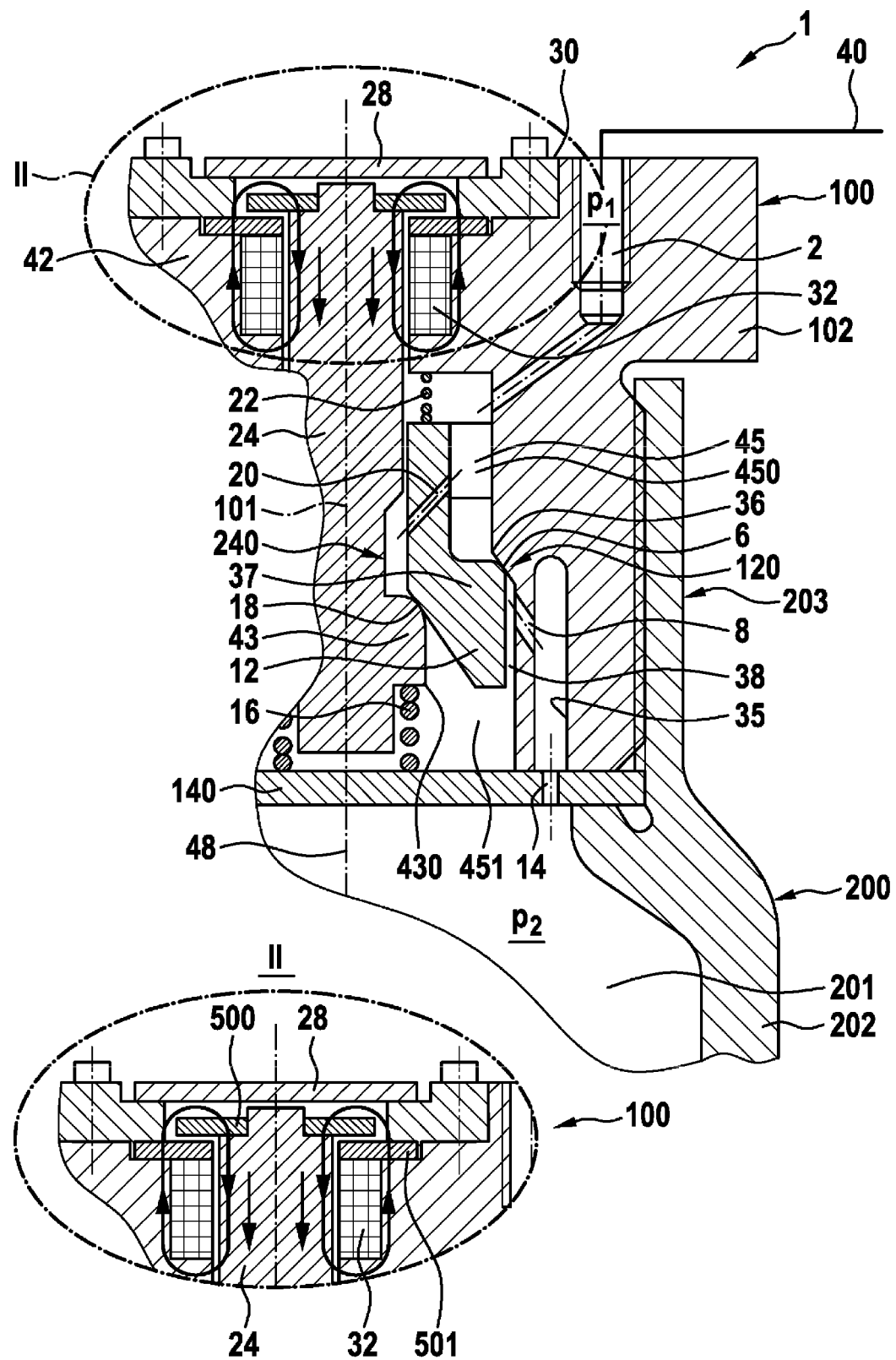

TANK DEVICE WITH A VALVE DEVICE

BACKGROUND

The invention relates to a tank device with a valve device, for example for a fuel cell system, in particular for storing hydrogen, for example for use in vehicles with a fuel cell drive.

DE 10 2018 201 055 A1 describes a tank device comprising at least two storage units, which comprise a control valve and which are connected via a line system to an output line. At least one control valve of at least one storage unit is designed as a main valve, and at least one control valve of at least one storage unit is designed as a secondary valve, wherein the main valve and the secondary valve are of different designs.

The safety devices for such a tank device are standardized. Each tank device must have such a shut-off valve. In the event of damage to the tank device caused by the vehicle, for example with a fuel cell drive, being in an accident or in the event of a line of the tank device rupturing, the shut-off valve can seal the tank so that gas cannot escape from the tank device.

Due to the high safety requirements placed on the shut-off valves and due to the high system pressures of, for example, 800 bar or more, such shut-off valves are structurally very challenging and have a large installation space. This in turn increases the total weight of the entire tank device which, in the event of the vehicle, for example with a fuel cell drive, being in an accident, can lead to high acceleration forces occurring and possible deformations of the valve device or the tank device.

SUMMARY

In contrast, the tank device according to the invention has the advantage that, in a structurally simple and cost-saving manner, a tank device is provided which has a compact safety valve with low opening forces.

For this purpose, the tank device has a valve device and a tank for storing a gaseous medium, in particular hydrogen, for a fuel cell system. The valve device has a valve housing, in which valve housing a pilot valve element, which can be moved along a longitudinal axis of the valve device, is arranged. The pilot valve element interacts with a first seal seat for opening and closing a through-opening and thus forms a pilot valve. Furthermore, the valve device comprises a solenoid coil, by means of which solenoid coil the pilot valve element can be moved along the longitudinal axis. A main valve element is arranged in the valve housing, which main valve element interacts with a second seal seat for opening and closing a through-opening and thus forms a main valve. The second sealing seat is formed as a conical shoulder on the valve housing. Moreover, between the valve housing and an integrally molded shaping of the main valve element, which integrally molded shaping interacts with the second seal seat for opening and closing the through-opening, a throttle channel is formed, which throttle channel comprises a conical widening counter to the direction of the second seal seat, as a result of which a throttling effect is formed. Furthermore, the valve device can be opened in the direction of the tank when the solenoid is energized.

An optimal design of the magnetic flux can thus be achieved in a structurally simple manner. Furthermore, the two-stage opening process means that only a small magnetic force is needed to open the valve device. As a result, minimal power and energy requirement and therefore a positive energy balance is achieved. Opening the valve device when the magnet coil is energized in the direction of the tank container achieves a structurally simple and cost-effective tank device.

In a first advantageous development of the invention, it is provided that the through-opening in the valve housing is formed at the level of the throttle channel and opens into the throttle channel. A chamber is advantageously formed in the valve housing, which chamber is connected to the throttle channel by means of the through-opening. The opening process of the valve device can thus be facilitated in a structurally simple manner.

In an advantageous development, it is provided that the valve device is arranged in a neck region of the tank device and is pressed against a tank floor within the neck region. Due to the structural design of the valve device within the neck region, a smaller pressure application area is achieved, which results in lower axial compressive forces. At high pressures, smaller pressure application areas constitute a high level of relief in terms of component loads, which is reflected in lower deformations, less wear and fewer density influences, and increased service life of the entire tank device and of the valve device.

In a further embodiment of the invention, it is advantageously provided that a discharge opening is formed in the tank floor, which discharge opening fluidically connects a tank interior and the chamber to one another. The interior of the valve device can thus be connected in a simple manner to a tank interior of the tank device.

In a further advantageous development of the invention, it is advantageously provided that the pilot valve element comprises a shoulder, on which shoulder a spring is supported and the pilot valve element is subjected to a force in the direction of one end of the pilot valve element.

The first seal seat is advantageously formed on the main valve element.

In a further development of the invention, it is advantageously provided that the main valve element is subjected to a force in the direction of the tank interior by means of a spring, as a result of which the main valve element is subjected to a force in the direction of the first seal seat and counter to the direction of the second seal seat.

In an advantageous embodiment of the invention, it is provided that an interior is formed in the valve housing, which interior is divided by the main valve element into a first partial interior and a second partial interior.

In a further development of the invention, it is advantageously provided that the first partial interior is connected to a supply line by means of a discharge channel formed in the valve housing, which supply line can be connected to a supply region of a consumer system, in particular to an anode region of a fuel cell system.

As a result, an opening process of the valve device is facilitated, which opening process requires low magnetic forces, since the opening process is assisted by pneumatic forces due to the structural design of the valve device.

In an advantageous development, it is provided that the first partial interior and the second partial interior can be fluidically connected by means of the first seal seat and/or the second seal seat.

The tank device described is preferably suitable for storing hydrogen for the operation of a fuel cell in a fuel cell system.

The tank device described for storing hydrogen for the operation of a fuel cell can furthermore be used advantageously in a fuel-cell-powered vehicle.

BRIEF DESCRIPTION OF THE DRAWINGS

The drawing shows exemplary embodiments of a tank device according to the invention for storing a gaseous medium, in particular hydrogen. The drawing shows:
an exemplary embodiment of a tank device according to the invention with a valve device in longitudinal section.

DETAILED DESCRIPTION

FIG. 1 shows an exemplary embodiment of a tank device 1 according to the invention with a longitudinal axis 48 in longitudinal section and in a simplified view, wherein the tank device 1 is rotationally symmetrical about the longitudinal axis 48.

The tank device 1 comprises a tank 200 and a valve device 100, wherein the valve device 100 is partially accommodated in the tank 200. The tank 200 has a tank housing 202 in which a tank interior 201 is formed.

Furthermore, the tank 200 has a neck region 203 in which the valve device 100 is partly accommodated. In this case, the valve device 100 is supported on a tank floor 140, which is arranged between the neck region 203 and the tank interior 201 and thus the tank interior 201 is delimited from the neck region 203.

The valve device 100 comprises a valve housing 102, in which a solenoid coil 32 is arranged, which can be supplied with current by means of an electrical connection 30. In this case, the electrical connection 30 is embodied in a magnetizable housing cover 28.

In addition, the housing cover 28 is produced here from a non-magnetic material in order to guide the force fields and thus the direction of movement of the pilot valve element 24 in the direction of the tank interior 201. The solenoid coil 32 is fastened to the valve housing 102 by means of a clamping ring 501. In an alternative embodiment, as shown in region II, a magnetic disk 500 can be arranged on the pilot valve element 24.

Furthermore, an interior 45 is formed in the valve housing 102, in which a pilot valve element 24 and a main valve element 12 are arranged.

The pilot valve element 24 is arranged coaxially with respect to the longitudinal axis 48 and comprises stepped recesses and a rounded shoulder 43, which is formed at an opposite end as step 430. On this step 430 a spring 16 is supported, which is also supported on the tank floor 140 and which subjects the pilot valve element 24 to a force in the direction of the solenoid coil 32, in FIG. 1 at the top, and thus to a force in the direction of one end 42 of the pilot valve element 24.

A main valve element 12 is arranged parallel to the pilot valve element 24, which main valve element is substantially L-shaped with an integrally molded shaping 37. In addition, the main valve element 12 comprises a through-opening 20 through which a first partial interior 450 and a second partial interior 451 can be fluidically connected. The interior 45 is divided by the main valve element 12 into the first partial interior 450 and the second partial interior 451.

The main valve element 12 is pretensioned by a spring 22 and is pressed by the latter against the rounded shoulder 43, wherein the spring 22 is supported on the valve housing 102. A first seal seat 18 is thus formed on the main valve element 12, which, together with the main valve element 12, interacts with the main valve element 12 for opening and closing a connection between the first partial interior 450 and the second partial interior 451 and thus for opening and closing the through-opening 20 and thus forms a pilot valve 240.

By means of the pilot valve element 24, the main valve element 12 is subjected to a force counter to the force of the spring 22 and is thus pressed with its integrally molded shaping 37 against a second seal seat 6, which is conically formed on the valve housing 102. The closing force is supported by the pressure in the tank interior 201 and the force of the spring 16. The closing force ensures secure closing of the main valve element 12 in the switched-off and non-energized state. As a result, the main valve element 12 interacts with the second seal seat 6 for opening and closing a through-opening 8 formed in the valve housing 102 and thus forms a main valve 120.

Between the valve housing 102 and the integrally molded shaping 37 of the main valve element 12, a throttle channel 38 is formed, which has a conical widening counter to the direction of the second seal seat 6, as a result of which a throttling effect is formed.

The through-opening 8 is formed at the level of the throttle channel 38 and opens into the throttle channel 38. Furthermore, the through-opening 8 opens into a chamber 35 formed in the valve housing 102, which chamber is connected to the tank interior 201 via discharge openings 14 formed in the tank floor 140.

The first partial interior 450 is connected by means of a discharge channel 2 formed in the valve housing 102 to a supply line 40, which can be connected to an anode region of a fuel cell system. The system pressure $p_1$ forms in the discharge channel 2.

The mode of operation of the tank device 1 is as follows: In the de-energized state of the solenoid coil 32, the first seal seat 18 and the second seal seat 6 are closed, so that no gaseous medium, here hydrogen, can flow out of the tank interior 202 via the valve device 100 into the supply line 40 in the direction of the anode region of the fuel cell system.

When the solenoid 32 is energized via the electrical connection 30, a magnetic field is formed, which results in a magnetic force effect between the pilot valve element 24 or the magnetic disk 500 and the clamping ring 501. In the event of adequately attracting magnetic forces, the pilot valve element 24 moves away from the housing cover 28 and thus compresses the spring 16. The longitudinal movement of the pilot valve element 24 leads to it lifting off from the first seal seat 18 and thus releasing an opening cross section from the second partial interior 451 into the first partial interior 450 and the through-opening 20.

The second partial interior 451 is fluidically connected to the tank interior 201 via the discharge opening 14, the chamber 35, the through-opening 8 and the throttle channel 38, so that the tank interior 201 is filled with hydrogen. Due to the hydrogen flowing off in the direction of the discharge channel 2 and thus into the supply line 40, a compensating pressure level around the main valve element 12 is formed by the pressure system depending on the medium removal.

As a result of the structural embodiment of the throttle channel 38 as a throttle, more medium, here hydrogen, can flow off via the through-opening 20 during the opening process than can flow through the throttle channel 38. In this way, an additional opening force acts on the main valve element 12. In addition, the pressure in the second partial interior 451 is reduced.

After a short opening time of the first seal seat 18, the pilot valve element 24 is pressure-compensated, leading to a pressure balance of the main valve element 12.

The force of the spring 22 supports the release of the second seal seat 6, since said force presses the main valve element 12 in opening force, so that the main valve element 12 lifts off from the second seal seat 6 and releases an opening cross-section between the through-opening 8 and the first partial interior 450. Thus, hydrogen now flows from the tank interior 201 via the through-opening 8 directly into the first partial interior 450 in the direction of the discharge channel 2 and thus into the supply line 40.

Thus, the first seal seat 18 and the second seal seat 6 are now released and, via both opening cross-sections, hydrogen flows out of the tank interior 201 via the valve device 100 into the supply line 40 in the direction of the anode region of the fuel cell system.

If the opening cross-section on the first seal seat 18 is smaller than the opening cross-section on the second seal seat 6, only small magnetic forces are required for the opening process of the pilot valve element 24 on the first seal seat 18.

If the energizing of the solenoid coil 32 is interrupted, the magnetic field collapses and a closing force on the pilot valve element 24 and the main valve element 12 is introduced via the spring 16. Depending on the pressure $p_2$, such as, for example, 15 to 1000 bar, in the tank interior 201, the closing force, together with the pressure in the neck region 203 of the tank device 1, is introduced via the pilot valve element 24 and the first seal seat 18 to the main valve element 12 with the second seal seat 6.

Both the first seal seat 18 and the second seal seat 6 are now blocked again, so that no more hydrogen can flow out of the tank interior 201 via the valve device 100 in the direction of the anode region of the fuel cell system. This principle of autonomous closing also works in the event of an emergency, when the power supply is interrupted. However, it should be noted here that the force of the spring 22, which acts counter to the desired flow of force, must not be selected too high and must be adapted accordingly. In an emergency, it is thus ensured that no hydrogen can escape from the tank device 1.

In the case of refueling, the discharge channel 2 is supplied with pressure via a connected tank unit, for example a filling station. The prevailing pressure in the discharge channel 2 is greater than in the remaining valve device 100. Due to the different pressure level, the pressure ratio at the second seal seat 6 is greater than in the remaining valve device 100, so that the main valve element 12 presses the pilot valve element 24 counter to the force of the spring 16 in the direction of the tank interior 201. The tank device 1 can now be filled via the released second seal seat 6 and via the through-opening 8 until the refueling operation is completed. If the refueling operation is ended, no further filling takes place so that the pressure around the main valve element 12 balances. The force of the spring 16, together with the resulting differential pressure from $p_2 > p_1$, again ensures the closing the first seal seat 18 and the second seal seat 6.

In addition to fuel-cell-operated vehicles, the tank device 1 for storing a gaseous medium can also be used, for example, for hydrogen storage in vehicles with a hydrogen combustion engine as a drive.

The invention claimed is:

1. A tank device (1) for storing a gaseous medium comprising a valve device (100) and a tank (200), wherein the valve device (100) comprises a valve housing (102), in which valve housing (102) a pilot valve element (24), which can be moved along a longitudinal axis (101) of the valve device (100), is arranged, which pilot valve element (24) interacts with a first seal seat (18) for opening and closing a first through-opening (20) and thus forms a pilot valve (240), wherein the valve device (100) comprises a solenoid coil (32) operable to move the pilot valve element (24) along the longitudinal axis (101), wherein a main valve element (12) is arranged in the valve housing (102), which main valve element (12) interacts with a second seal seat (6) for opening and closing a second through-opening (8) and thus forms a main valve (120), wherein the second seal seat (6) is configured as a conical shoulder (36) on the valve housing (102), wherein between the valve housing (102) and an integrally molded shaping (37) of the main valve element (12), which integrally molded shaping (37) interacts with the second seal seat (6) to open and close the second through-opening (8), a throttle channel (38) is formed, which throttle channel (38) comprises a conical widening towards the second through-opening (8), as a result of which a throttling effect is formed, wherein the valve device (100) can be opened in a direction of the tank (200) when the solenoid coil (32) is energized.

2. The tank device (1) according to claim 1, wherein the second through-opening (8) in the valve housing (102) is formed at a level of the throttle channel (38) and opens into the throttle channel (38).

3. The tank device (1) according to claim 2, wherein a chamber (35) is formed in the valve housing (102), which chamber (35) is connected to the throttle channel (38) by the second through-opening (8).

4. The tank device (1) according to the claim 3, wherein the valve device (100) is arranged in a neck region (203) of the tank device (1) and is pressed against a tank floor (140) within the neck region (203).

5. The tank device (1) according to claim 4, wherein a discharge opening (14) is formed in the tank floor (140), which discharge opening fluidically connects a tank interior (201) and the chamber (35) to one another.

6. The tank device (1) according to claim 1, wherein the pilot valve element (24) comprises a shoulder (43), on which shoulder (43) a spring (16) is supported and the pilot valve element (24) is subjected to a force in a direction of one end (42) of the pilot valve element (24).

7. The tank device (1) according to claim 1, wherein the first seal seat (18) is formed on the main valve element (12).

8. The tank device (1) according to claim 1, wherein the main valve element (12) is subjected to a force in a direction of a tank interior (201) by a spring (22), as a result of which the main valve element (12) is subjected to a force in a direction of the first seal seat (18) and counter to a direction of the second seal seat (6).

9. The tank device (1) according to claim 1, wherein an interior (45) is formed in the valve housing (102), which interior (45) is divided by the main valve element (12) into a first partial interior (450) and a second partial interior (451).

10. The tank device (1) according to claim 9, wherein the first partial interior (450) is connected to a supply line (40) by a discharge channel (2) formed in the valve housing (102), which supply line (40) can be connected to a supply region of a consumer system.

11. The tank device (1) according to claim 10, wherein the supply region of the consumer system is an anode region of a fuel cell system.

12. The tank device (1) according to claim 9, wherein the first partial interior (450) and the second partial interior (451) can be fluidically connected by the first seal seat (18) and/or the second seal seat (6).

13. A fuel cell system with a tank device (1) for storing hydrogen for operating a fuel cell according to claim 1.

14. A fuel-cell-powered vehicle with a tank device (1) for storing hydrogen for operating a fuel cell according to claim 1.

15. The tank device (1) according to claim 1, wherein the gaseous medium is hydrogen.

16. A tank device (1) for storing a gaseous medium comprising a valve device (100) and a tank (200), wherein the valve device (100) comprises a valve housing (102), in which valve housing (102) a pilot valve element (24), which can be moved along a longitudinal axis (101) of the valve device (100), is arranged, which pilot valve element (24) interacts with a first seal seat (18) for opening and closing a first through-opening (20) and thus forms a pilot valve (240), wherein the valve device (100) comprises a solenoid coil (32) operable to move the pilot valve element (24) along the longitudinal axis (101), wherein a main valve element (12) is arranged in the valve housing (102), which main valve element (12) interacts with a second seal seat (6) for opening and closing a second through-opening (8) and thus forms a main valve (120), wherein the second seal seat (6) is configured as a conical shoulder (36) on the valve housing (102), wherein between the valve housing (102) and an integrally molded shaping (37) of the main valve element (12), which integrally molded shaping (37) interacts with the second seal seat (6) to open and close the second through-opening (8), a throttle channel (38) is formed, which throttle channel (38) comprises a conical widening towards the second through-opening (8), as a result of which a throttling effect is formed, wherein the valve device (100) can be opened in a direction of the tank (200) when the solenoid coil (32) is energized, and wherein the valve device (100) is arranged in a neck region (203) of the tank device (1) and is pressed against a tank floor (140) within the neck region (203).

17. The tank device (1) according to claim 16, wherein a discharge opening (14) is formed in the tank floor (140), which discharge opening fluidically connects a tank interior (201) and a chamber (35) to one another.

* * * * *